(12) United States Patent
Heitplatz

(10) Patent No.: US 9,169,084 B2
(45) Date of Patent: Oct. 27, 2015

(54) APPARATUS FOR SINGULATING LOAD ITEMS

(71) Applicant: BEUMER GmbH & Co. KG, Beckum (DE)

(72) Inventor: Heino Heitplatz, Drensteinfurt (DE)

(73) Assignee: Beumer GmbH & Co. KG, Beckum (DE)

( * ) Notice: Subject to any disclaimer, the term of this patent is extended or adjusted under 35 U.S.C. 154(b) by 0 days.

(21) Appl. No.: 14/316,909

(22) Filed: Jun. 27, 2014

(65) Prior Publication Data
US 2015/0001042 A1    Jan. 1, 2015

(30) Foreign Application Priority Data
Jun. 27, 2013  (DE) .................... 20 2013 005 786 U

(51) Int. Cl.
| | |
|---|---|
| *B65G 47/54* | (2006.01) |
| *B65G 47/53* | (2006.01) |
| *B65G 47/57* | (2006.01) |
| *B65G 47/30* | (2006.01) |
| *B65G 47/31* | (2006.01) |

(52) U.S. Cl.
CPC ............... *B65G 47/57* (2013.01); *B65G 47/30* (2013.01); *B65G 47/31* (2013.01)

(58) Field of Classification Search
None
See application file for complete search history.

(56) References Cited

U.S. PATENT DOCUMENTS

| | | | | |
|---|---|---|---|---|
| 3,913,730 | A | * | 10/1975 | Gruodis et al. ........ B65G 47/78 193/2 R |
| 6,015,039 | A | * | 1/2000 | Bonnet .................. B65G 47/49 198/360 |

* cited by examiner

*Primary Examiner* — Kavel Singh
(74) *Attorney, Agent, or Firm* — Renner, Otto, Boisselle & Sklar, LLP

(57) ABSTRACT

Apparatus for singulating load items, with first conveyor means working in a delivery direction and having a first conveying surface for delivering load items, with second conveyor means disposed adjacent to a transfer region of the first conveyor means and having a second conveying surface for receiving the load items delivered by the first conveyor means and for conveying the load items away therefrom. The first conveying surface slopes downwards in the delivery direction and towards the second conveyor means, with a guide means disposed between the transfer region of the first conveyor means and the receiving region of the second conveyor means for the controlled transfer of load items from the first to the second conveyor means. The guide means has a guiding surface running along the transfer region, which projects at a height that declines in the delivery direction above an extension plane of the first conveying surface.

17 Claims, 4 Drawing Sheets

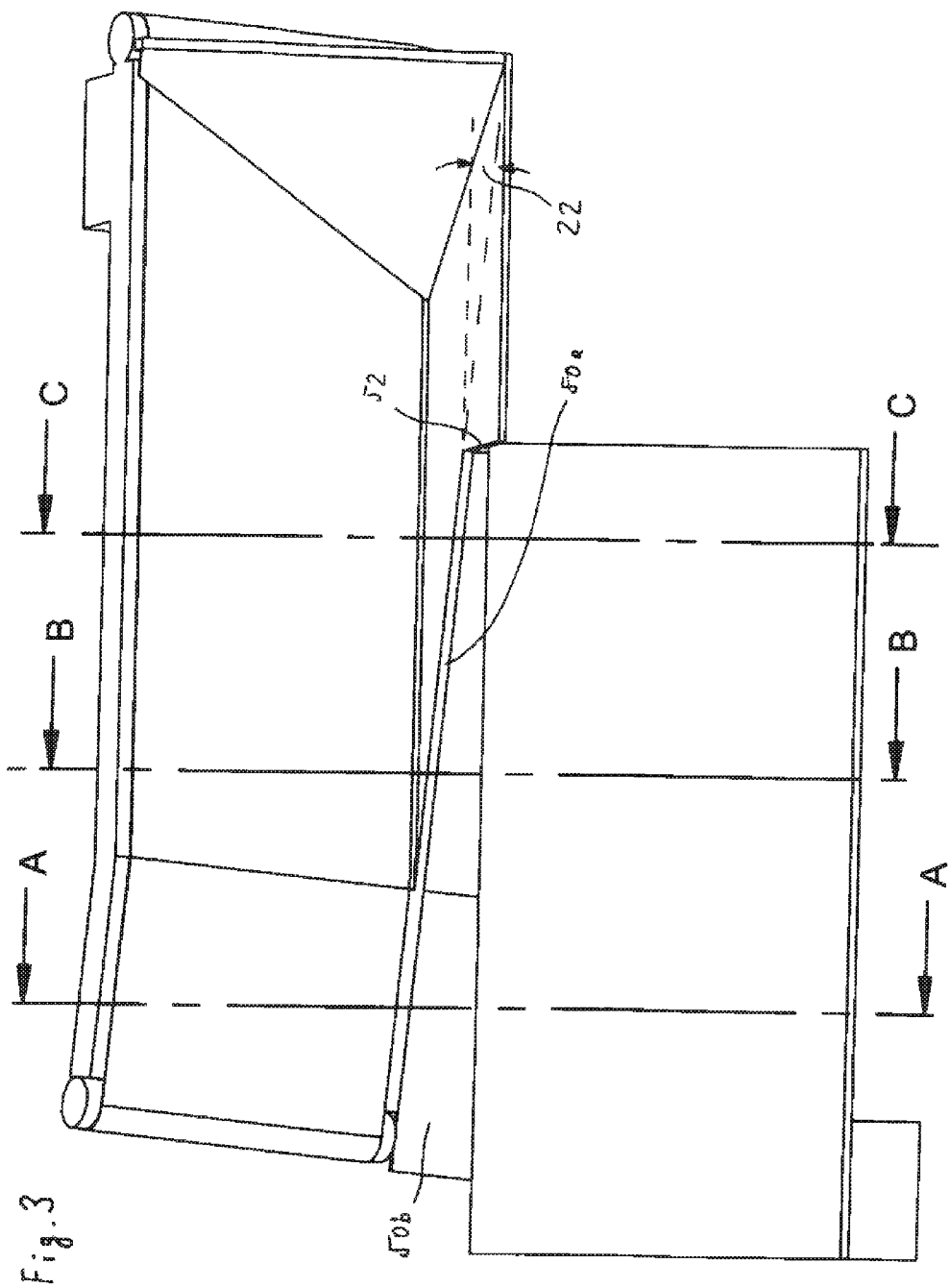

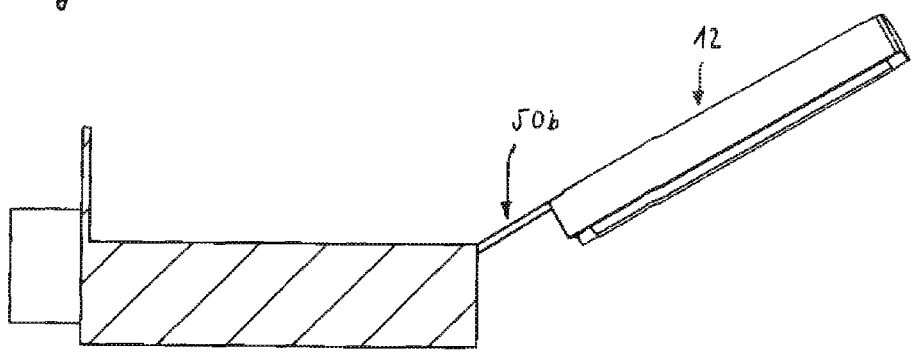
Fig. 4  Section A-A
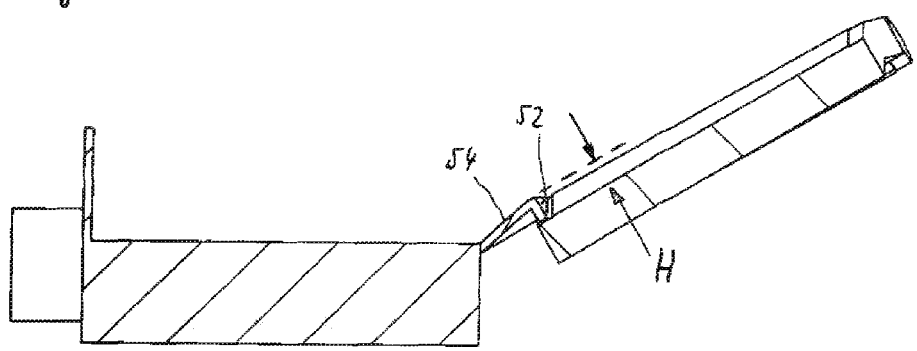
Fig. 5  Section B-B
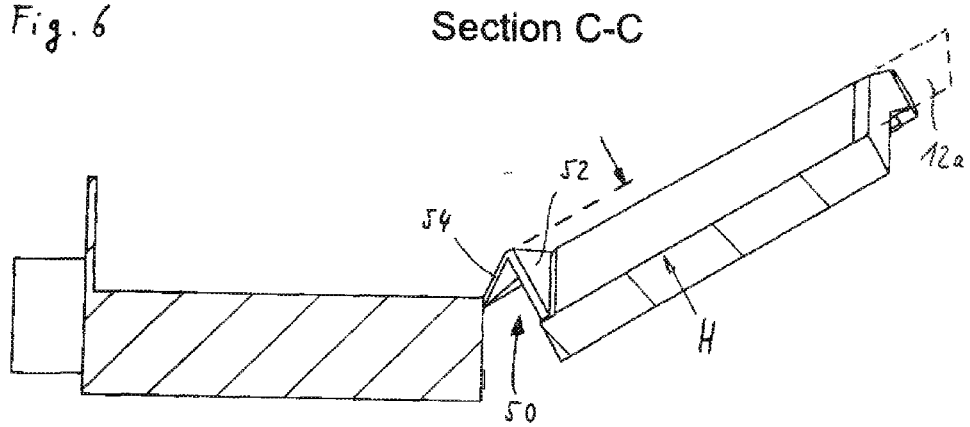
Fig. 6  Section C-C

APPARATUS FOR SINGULATING LOAD ITEMS

CROSS-REFERENCE TO RELATED APPLICATION

The present application claims priority under 35 U.S.C. §119(a) to German Application No. 20 2013 005 786.6 filed Jun. 27, 2013, the entirety of which is hereby incorporated herein by reference.

TECHNICAL FIELD

The invention relates to an apparatus for singulating load items, with a first conveyor means working in a delivery direction and having a first conveying surface for delivering load items, with a second conveyor means disposed adjacent to a transfer region of the first conveyor means and having a second conveying surface for receiving the load items delivered by the first conveyor means in a receiving region and for conveying the load items away from the receiving region.

BACKGROUND

Numerous apparatuses are known for singulating load items, such as in the form of a plurality of successive conveyors, for example as in WO2011/112449 A2, EP 1 345 822 B1 or EP 1 854 749 B1, which take up a relatively large amount of space.

The problem of the invention consists in providing a space-saving apparatus for singulating load items which is simple in design.

SUMMARY

This problem is solved in an arrangement of the generic kind in that the first conveying surface slopes downwards at a transverse angle of inclination in the transfer region transversely to the delivery direction and towards the second conveyor means relative to a horizontal plane, with a guide means disposed between the transfer region of the first conveyor means and the receiving region of the second conveyor means for the controlled transfer of load items from the first to the second conveyor means, wherein the guide means has a guiding surface running along the transfer region, which projects at a height that declines in the delivery direction above an extension plane of the first conveying surface.

The guiding surface may run in the delivery direction, or at an angle to the delivery direction at a damming angle of up to 5°, 10° or 15°.

The first conveying surface may be arranged at a transverse angle of inclination of at least 10°, for example at least 15°, 20°, 25°, 30°, 35°, 40° or 45°.

With an apparatus of this kind, it is possible partially or completely to rearrange load items delivered by the first conveyor means, which are delivered side by side and on several levels one on top of the other in the form of a disordered pile-like arrangement (3D bulk), in such a way that a side-by-side arrangement of the load items is formed, without individual load items lying on top of one another (2D bulk). Because the height of the guiding surface decreases in the delivery direction, the guide means serves as a guide member, against which the load items delivered are dammed up, as a result of which load items lying on top of one another gradually slide off one another as they move along the guiding surface, displaced by the following load items and gravity, and then land on the second conveyor means in a side-by-side arrangement.

The guide means can be designed with a wedge shape in the delivery direction, wherein the height by which it projects above the first conveying surface may decline continuously in the delivery direction until the guide means terminates flush with the first conveying surface.

The first conveying surface may run horizontally, seen in the delivery direction, or may be arranged sloping upwards at a longitudinal angle of inclination of, for example, up to 5°, 10°, 15°, 20° or 30° relative to a horizontal plane.

The second conveying surface may be arranged horizontally, seen transversely to the longitudinal direction. Seen in the longitudinal direction, the second conveying surface may be arranged horizontally, sloping slightly upwards or sloping slightly downwards, for example sloping slightly upwards or downwards by up to 5°, 10°, 15° or 20°.

The guiding surface may form an angle of between 90° and 120° to the first conveying surface, which on the one hand ensures that the guiding surface can still act as a storage area for load items arriving, and on the other hand helps load items lying on top of other load items to slide off over the guide means.

Although it is preferably contemplated that the guiding surface is a level surface, it is possible for the guiding surface to be curved, it being possible for a local angle at which the guiding surface slopes relative to a plane in which the first conveying surface extends to increase as the height of the guiding surface relative to the first conveying surface increases (seen in the direction of the first conveying surface, convex shape) or to decrease (seen in the direction of the first conveying surface, concave shape), in oder to influence the guiding or damming up effect of the guiding surface as a whole or in particular areas in a targeted manner.

The first conveyor means may be a belt or roller conveyor. It is possible for the first conveyor means to be designed as a conveyor belt or modular belt with embedded rollers, where the rollers are designed as passive, not driven, rollers with an axis of rotation in the delivery direction. As a result, there is a high coefficient of friction in the delivery direction, as in the case of rubberised rollers for example, and a low coefficient of friction transversely to the delivery direction, so that it is easier to transfer the load items from the transfer region to the receiving region.

In the simplest case, the second conveyor means may be designed as described above for the first conveyor means, though it is preferably a belt or roller conveyor, and it is preferably contemplated that the second conveyor means is designed as a conveyor belt or modular belt with embedded rollers, especially as described in WO2006/121750 A1 (technology with rollers that can be activated selectively).

If the first and second conveyor means have a conveyor belt or belt conveyor, the delivery direction and a removal conveying direction are the same as the direction of movement of the respective conveyor belt or belt conveyor and its longitudinal direction. At least in the transfer region of the first conveyor means and in the receiving region of the second conveyor means, the load items have a motion component transverse to the delivery or removal conveying direction, which can be supported by the arrangement of passive or active rollers.

BRIEF DESCRIPTION OF THE DRAWINGS

The invention will now be explained by describing a worked embodiment, reference being made to a drawing, in which FIG. 3 shows a view of the apparatus according to FIGS. 1 and 2, seen from above, FIG. 4 shows a section view according to FIG. 3 A-A, FIG. 5 shows a section view according to FIG. 3 B-B, FIG. 6 shows a section view according to FIG. 3 C-C.

DETAILED DESCRIPTION

Figure 1:
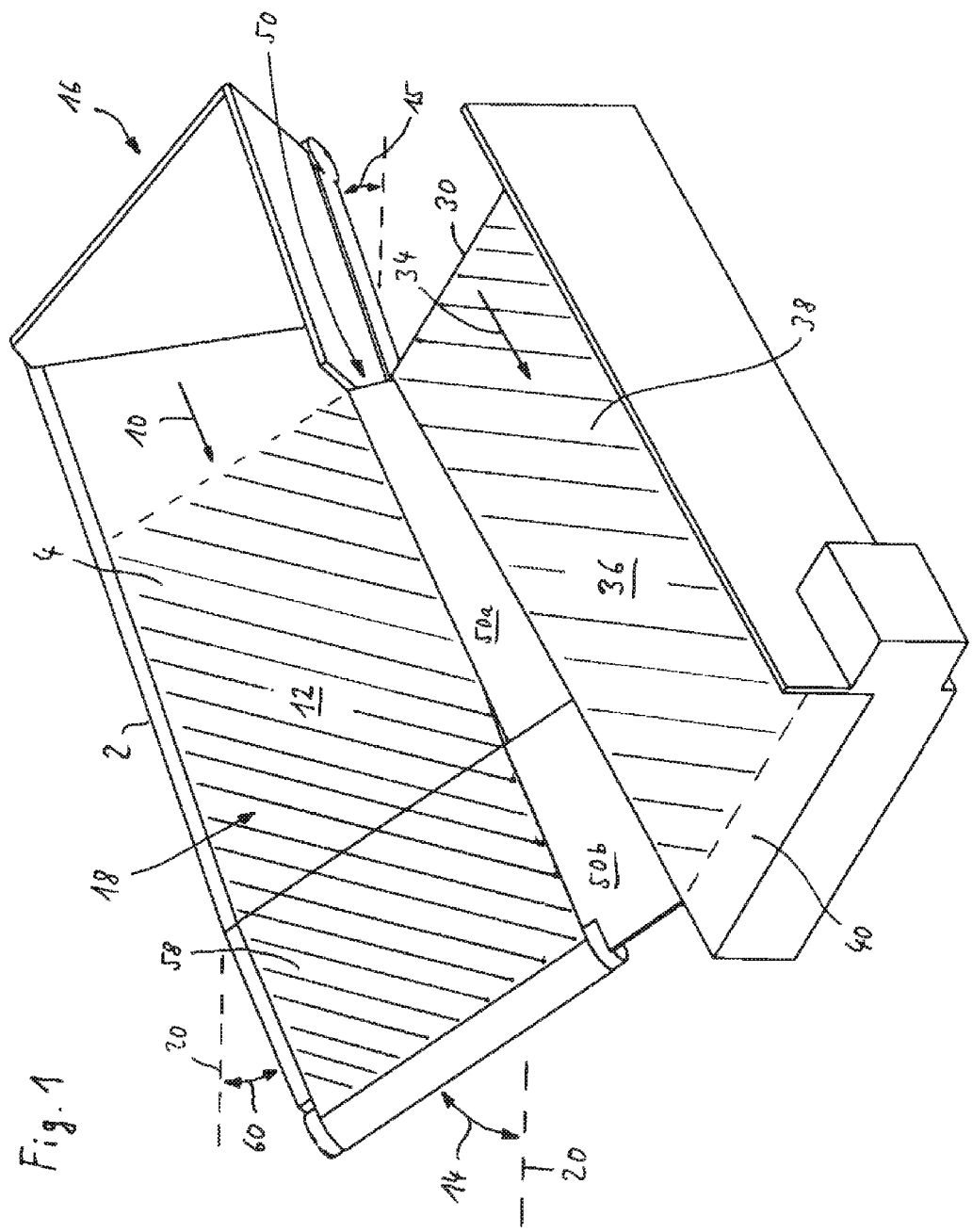
FIG. 1 shows a perspective view of an apparatus in accordance with the invention for singulating load items, where a first conveyor means is illustrated in a transfer region and a second conveyor means is illustrated in a receiving region.

The apparatus illustrated for singulating load items comprises a first conveyor means 2 with a conveyor belt 4, which is driven in a delivery direction 10. A first conveying surface 12 of the first conveyor means 2 or of the conveyor belt 4 is arranged sloping transversely to the delivery direction 10 at a transverse angle of inclination 14 relative to a horizontal plane 20 so that load items delivered in the delivery direction 10 can slide off transversely to the delivery direction 10. The size of the transverse angle of inclination 14 depends among other things on the sliding characteristics of the load items delivered, since the apparatus is based on the idea that load items lying on top of one another slide off one another. The transverse angle of inclination 14 may lie in a range of between 5° and 45°, for example, and is preferably between 20° and 35°. The angle 14 can be set or may also be adjustable during operation of the apparatus or adaptable to current situations.

In addition, the first conveying surface is arranged rising at a longitudinal angle of inclination 15 when seen in the delivery direction 10, for example with a slope of approx. 5 to 10°.

The first conveyor means 2 comprises a delivery region 16, in which the load items are conveyed substantially in the delivery direction 10, and a transfer region 18 (hatched) immediately downstream of the delivery region 16 in the delivery direction 10, in which the load items are given a motion component transverse to the delivery direction 10 and slide off the first conveyor means 2. In the delivery region 16, the first conveying surface may have a different transverse angle of inclination from the one in the transfer region, especially a smaller transverse angle of inclination, right down to 0° (no transverse inclination).

Although the conveying surface 12 of the first conveyor means 2 may run between indicated drive and return rollers 6, 8, a variant is possible which is indicated in FIGS. 1 and 3. Part of the conveying surface 12, a conveying surface 58, directly abuts a first part of the conveying surface 12 by means of a kink joint in the delivery direction 10 and can be implemented as a separate conveyor belt. Seen in the delivery direction 10, the conveying surface 58 may be arranged sloping downwards relative to a horizontal plane 20 at a longitudinal angle of inclination 60 of 5° to 20°, preferably at 10°.

Adjacent to the first conveyor means 2, a second conveyor means 30 is arranged with a second conveyor belt 32, which is driven in a removal conveying direction 34 or longitudinal direction and has a second conveying surface 36. Adjacent to the transfer region 18 of the first conveyor means 2, the second conveyor means 30 has a receiving region 38 (hatched) and a removal conveying region 40 abutting the receiving region 38 in the removal conveying direction 34. Whereas load items delivered by the first conveyor means 2 in the receiving region 38 have a motion component transverse to the removal conveying direction 34, in the removal conveying region 40 they are moved substantially in the removal conveying direction 34. The removal conveying direction 34 may be parallel to the delivery direction 10 or may form any angle to it.

Figure 2:
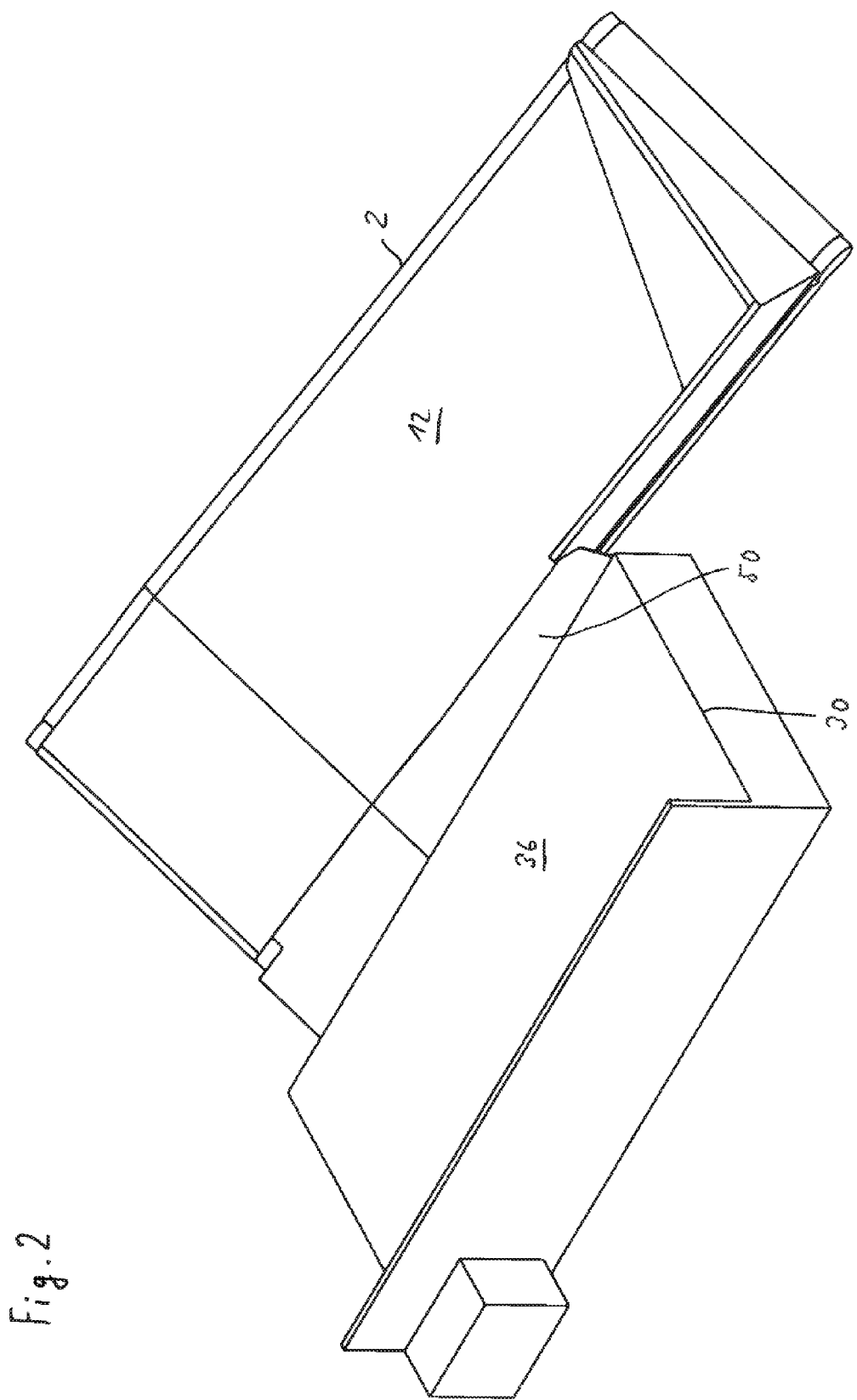
FIG. 2 shows the apparatus of FIG. 1 seen from a different direction.

According to the invention, a guide means 50 is arranged between the transfer region 18 of the first conveyor means 2 and the receiving region 38 of the second conveyor means 30, said guide means 50 being designed as stationary member with a guiding surface 52 pointing to the first conveyor means 2. As can be seen especially from the section views according to FIGS. 4, 5 and 6, the guiding surface 52 is arranged by way of example perpendicularly to the first conveying surface 12 or its extension plane 12a and in this connection has a height H, which reduces continuously to zero along the transfer region 18, seen in the delivery direction 10. As FIGS. 1 and 2 show, the guide means 50 runs as described above in a first part 50a in the example illustrated, while a second, part 50b of the guide means 50 follows immediately downstream and is formed as a level transitional surface between the first conveyor means 2 and the second conveyor means 30. Whereas the second part or the transitional surface 50b is formed in the embodiment illustrated in one plane with the first conveying surface 12, it may be contemplated in a variant that the transitional surface 50b is designed sunken or recessed relative to the first conveying surface 12. The conveying surface 58 can be arranged adjacent to the transitional surface 50b.

The guiding surface 52 could run parallel to the delivery direction 10, but is preferably arranged at a damming angle 22 (FIG. 3) of, for example, 5° thereto in order to achieve a damming effect against the guide means for the load items conveyed.

The guiding surface 52 passes over into a discharge surface 54 which slopes towards the second conveyor means, said discharge surface 54 running at an inclined tilt to the second conveying surface 36. The discharge surface 54 adjoins the transitional surface 50b.

As already explained in the introduction to the description, the first conveyor means 2 is a belt conveyor, or preferably a conveyor or modular belt with embedded rollers moving as a single unit in the delivery direction. The embedded rollers are preferably not driven and have an axis of rotation aligned in to the delivery direction 10, so that load items can be conveyed in the delivery direction 10 but load items with very low coefficients of (rolling) friction lying directly on the first conveyor means can slide off transversely to the delivery direction towards the guide means and the second conveyor means. The rollers are, for example, coated with rubber and have a high coefficient of friction, seen in the delivery direction 10.

The second conveyor means 30 is preferably implemented as an inclined roller conveyor, such as in a herringbone arrangement, wherein the rollers are arranged at an acute angle to the conveying direction, for example at an angle of between 10° and 20°. Alternatively, it is possible to implement the second conveyor means 30 with rollers that can be selectively activated or driven in accordance with WO2006/121750 A1. The purpose of this design of the second conveyor means 30 is to convey load items which have arrived in the receiving region 38 via the guide means rapidly out of that region in order to prevent a jam of load items in the receiving region 38, and in particular to prevent load items from lying on top of one another.

LIST OF REFERENCE NUMERALS 2 first conveyor means
4 first conveyor belt
6, 8 drive and return roller 10 delivery direction
12 first conveying surface
12a extension plane (of 12)
14 transverse angle of inclination (of 12)
15 longitudinal angle of inclination (of 12)
16 delivery region
18 transfer region
20 horizontal plane
22 damming angle
30 second conveyor means
32 second conveyor belt
34 removal conveying direction (longitudinal direction)
36 second conveying surface
38 receiving region
40 removal conveying region
50 guide means
50a first part
50b second part (transitional surface)
52 guiding surface
58 conveying surface
60 longitudinal angle of inclination (of 58)
H height (of 52 relative to 12)

The invention claimed is:

1. An apparatus for singulating load items, with a first conveyor means working in a delivery direction and having a first conveying surface for delivering load items, with a second conveyor means disposed adjacent to a transfer region of the first conveyor means and having a second conveying surface for receiving the load items delivered by the first conveyor means in a receiving region and for conveying the load items away from the receiving region, wherein the first conveying surface slopes downwards at a transverse angle of inclination in the transfer region transversely to the delivery direction and towards the second conveyor means relative to a horizontal plane, with a guide means disposed between the transfer region of the first conveyor means and the receiving region of the second conveyor means for the controlled transfer of load items from the first to the second conveyor means, wherein the guide means has a guiding surface running along the transfer region, which projects at a height (H) that tapers in the delivery direction above an extension plane of the first conveying surface.

2. The apparatus as claimed in claim 1, wherein the first conveying surface is arranged horizontally, seen in the delivery direction, or sloping upwards at a longitudinal angle of inclination relative to the horizontal plane.

3. The apparatus as claimed in claim 1, wherein the second conveying surface is arranged horizontally, seen transversely to a longitudinal direction.

4. The apparatus as claimed in claim 1, wherein the second conveying surface is arranged horizontally, sloping upwards or downwards, seen in a longitudinal direction.

5. The apparatus as claimed in claim 1, wherein the guiding surface forms an angle of between 90° and 120° to the first conveying surface.

6. The apparatus as claimed in claim 1, wherein the guiding surface is level.

7. The apparatus as claimed in claim 1, wherein the guiding surface has a low-friction coating or is equipped with embedded rollers whose axes of rotation can be parallel to the delivery direction.

8. The apparatus as claimed in claim 1, wherein a portion of the transfer region of the first conveying surface adjacent to the guide means is located above the second conveying surface.

9. The apparatus as claimed in claim 1, wherein the first conveyor means is a belt or roller conveyor.

10. The apparatus as claimed in claim 9, wherein the embedded rollers are implemented as non-driven rollers with an axis of rotation in the delivery direction.

11. The apparatus as claimed in claim 1, wherein the second conveyor means is a belt or roller conveyor, which optionally further comprises a conveyor or modular belt with embedded rollers.

12. The apparatus as claimed in claim 11, wherein the embedded rollers are adapted to be activated selectively.

13. The apparatus as claimed in claim 2, wherein the second conveying surface is arranged horizontally, seen transversely to a longitudinal direction.

14. The apparatus as claimed in claim 2, wherein the second conveying surface is arranged horizontally, sloping upwards or downwards, seen in a longitudinal direction.

15. The apparatus as claimed in claim 3, wherein the second conveying surface is arranged horizontally, sloping upwards or downwards, seen in a longitudinal direction.

16. The apparatus as claimed in claim 13, wherein the second conveying surface is arranged horizontally, sloping upwards or downwards, seen in a longitudinal direction.

17. The apparatus as claimed in claim 9, wherein the first conveyor means is a belt or roller conveyor in the form of a conveyor or modular belt with embedded rollers.

* * * * *